(12) United States Patent
Fery

(10) Patent No.: US 6,828,973 B2
(45) Date of Patent: Dec. 7, 2004

(54) METHOD AND SYSTEM FOR 3-D OBJECT MODELING

(75) Inventor: Guy Andre Fery, New York, NY (US)

(73) Assignee: Nexvisions LLC, New York, NY (US)

( * ) Notice: Subject to any disclaimer, the term of this patent is extended or adjusted under 35 U.S.C. 154(b) by 128 days.

(21) Appl. No.: 10/211,500

(22) Filed: Aug. 2, 2002

(65) Prior Publication Data

US 2004/0125109 A1 Jul. 1, 2004

(51) Int. Cl.[7] .............................................. G06T 13/00

(52) U.S. Cl. ...................................... 345/473; 345/419

(58) Field of Search ................................. 345/473, 422, 345/599, 629, 420; 382/284; 348/452, 459, 584, 586, 911; 353/7, 30

(56) References Cited

U.S. PATENT DOCUMENTS 5,428,399 A * 6/1995 Robinson et al. ............ 348/459
6,266,068 B1 * 7/2001 Kang et al. .................. 345/629

* cited by examiner

*Primary Examiner*—Mark Zimmerman
*Assistant Examiner*—Lance W. Sealey
(74) *Attorney, Agent, or Firm*—Skadden, Arps, Slate, Meagher & Flom LLP

(57) ABSTRACT

3-D views of a 2-D image containing objects are provided by simulation of inter-object volume and intra-object volume. Intra-object volume is simulated by defining a plurality of volumetric slices from the object and assigning relative volume values to each. Multiple views of the object are simulated by displacing each slice in accordance with the defined volumetric effect as part of an animation sequence simulating progressive movement about a focus point of the object.

5 Claims, 13 Drawing Sheets

METHOD AND SYSTEM FOR 3-D OBJECT MODELING

FIELD OF THE INVENTION

The present invention relates to graphical modeling, specifically the invention relates to volumetric simulation from a two dimensional input image.

BACKGROUND OF THE INVENTION

Stereoscopic systems present a viewer with an image of an object such that the object appears to have depth. The wide variety of techniques to provide such images commonly involve presenting different views of the object to each eye to simulate such images. Traditional stereoscopic systems employ an apparatus that keeps the left and right eye images directed solely at the appropriate eye such as by employing helmets or shutter glasses.

Autostereoscopic displays do not require special viewing equipment. Such displays are attractive because they offer the closest approximation to how people view the "real" world around us, unencumbered by external viewing apparatus. Lenticular surfaces, used to simulate a 3-D image on a 2-D surface, are an example of autostereoscopic displays. The image presented on the lenticular surface typically includes at least one object and a background. Each object is associated with a relative spacing from the background, and in some cases, the other objects, so as to provide a view of the image as would appear to a moving observer of a 3-D scene. However, the present techniques for providing 3-D lenticular images are limited in that they only provide for convenient simulation of depth between objects and the background, and between the objects themselves. Moreover, the present techniques are not easily automated by, for example, a computer program. Furthermore, present techniques may only provide an adequate simulation of depth when the angle of view to the lenticular surface is changed. Accordingly, there is a need for a method for providing an image on a lenticular surface which simulates both intra-object volume and inter-object volume. There is a further need for a method of inter-object volume simulation which is adapted for automation.

SUMMARY OF THE INVENTION

Therefore, in accordance with the present invention, a series of frames are provided as part of a lenticular image. Each frame provides an animation state with certain relative displacement between objects of the image. Furthermore, each object of the image is subdivided into a plurality of layers in accordance with a mask series. The layers are displaced relative to one another in accordance relative orientation for various observation points, each corresponding to a frame in a frame sequence. Accordingly, the series of frames provides simulation of object volume by relative displacement of layers within the object. The series of frames also provides an animation sequence that includes various angle views of the object.

In one embodiment the invention provides a method for producing an input image for application from a two dimensional image onto an image surface adapted to present interlaced frames of the input image. The method receives an input image, which includes at least one object. The method receives layer definitions for a plurality of layers from at least one object of the input image. The method receives an indication of the total displacement for the object animation. The method then determines a relative displacement for each layer from the plurality of layers. The method generates a sequence of image frames by progressively offsetting said plurality of layers in accordance with relative layer displacement and a total animation displacement. Finally, the method interlaces the animated sequence of frames to a combined image to provide an input interlaced image for application to said image surface.

DETAILED DESCRIPTION OF THE INVENTION

Figure 1:
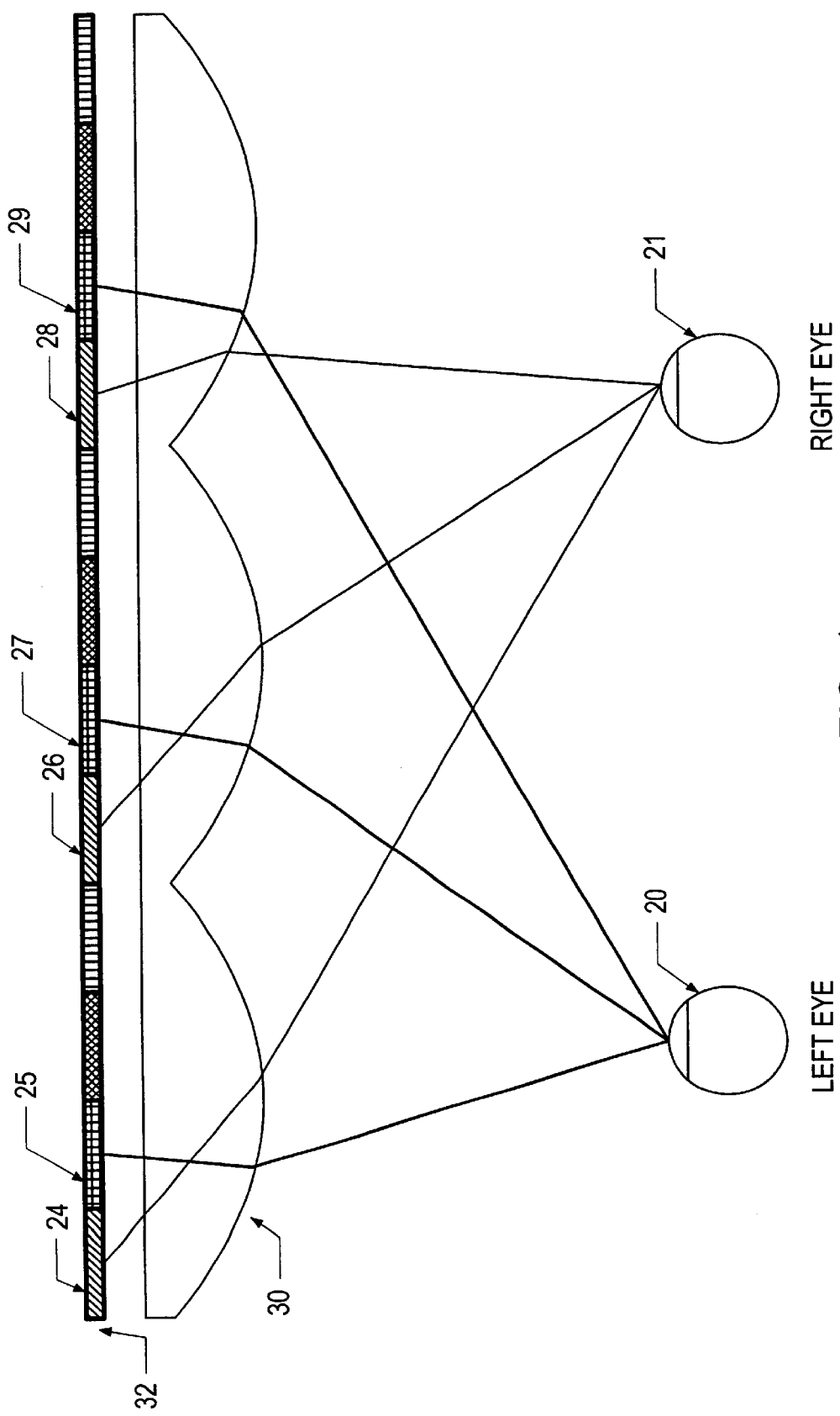
FIG. 1 illustrates a typical lenticular sheet.

FIG. 1 illustrates a lenticular surface and a corresponding interlaced image 32. "Lenticule" is a synonym for "lens" but has come to mean a sheet of long thin lenses. The Lenticular surface preferably contains a series of cylindrical lenses 30 molded into a plastic substrate. Each lens focuses on a strip from an image on the back side of the lenticular surface 32. As illustrated in FIG. 1, the lenticular image is positioned so that the line of sight for each one of an observer's eyes 20, 21 is focused onto different groups of strips 24, 26, 28 and 25, 27, 29, associated with different images. The lenticular sheet is preferably made so that the back side of the sheet 32 is exactly one focal length behind the lens 30 so that the image data emerges collimated from each individual lens.

Figure 2:
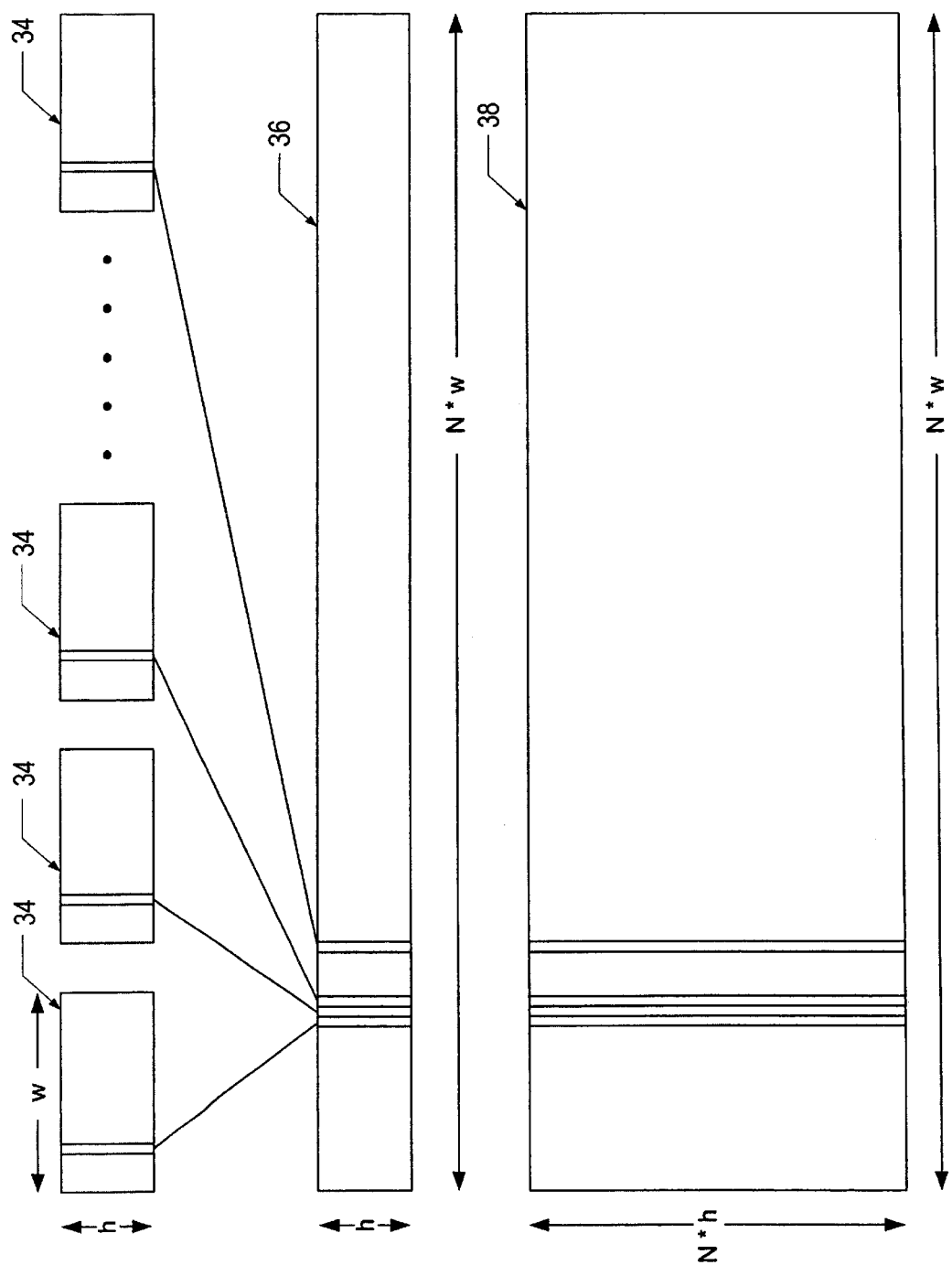
FIG. 2 illustrates a plurality of image frames and an interlaced image.

FIG. 2 illustrates a common arrangement of frame portions in an interlaced image. The illustrated case is for N sub-images 34 that are interlaced to form a composite 36 that is N times wider than the individual images. The final image 38 is stretched vertically so as to form a lenticular image than is of the same proportions as the sub-images 34 but N time larger (vertically a well as horizontally). It should be noted that the final stretching could be performed just before printing. Hence, the vertically stretched version need not be saved.

A number of method are employed in the prior art to create the N sub-images when 3-D information is available. For example, if a computer based 3-D model and rendering package are available, the N sub-images may be created by positioning of the simulated camera at various angles by lateral movement around the object. The same is with a physical static object that is available, where positioning of the camera is the only requirement. Using a computer model, a focal point is usually chosen in the middle of the object of interest. The computer camera position is then moved in regular steps to vary the viewing angle to the focal point. As may be appreciated, the exact step size and the number of images depends on the lens spacing of the lenticular sheets being used, the resolution of the printing system available, and the quality of the stereopis.

Often times, it is not possible to move a camera position about a subject, either by computer program or by physical relocation. For example, the object may be from a photograph taken some time before the simulation effort and is no longer available for acquiring multiple view images. At other times, the photographed subject is in motion or is continuously changing such as a splashing drink, where capturing multiple angles of the object is expensive and difficult. Furthermore, a scene may require extensive manipulation and the addition of numerous objects or may include a hand drawing for which depth information is not available. Accordingly, the present invention provides a method for simulating 3-D views of an object without acquiring images of the object at multiple angles or employing computer based 3-D model and 3-D rendering package. Rather, the invention employs a mask series and motion definitions specific to the objects to provide animated frames of the object. These animated frames are then incorporated into an interlaced image for the lenticular surface or are provided to a motion sequence viewer as an animation sequence.

Figure 3:
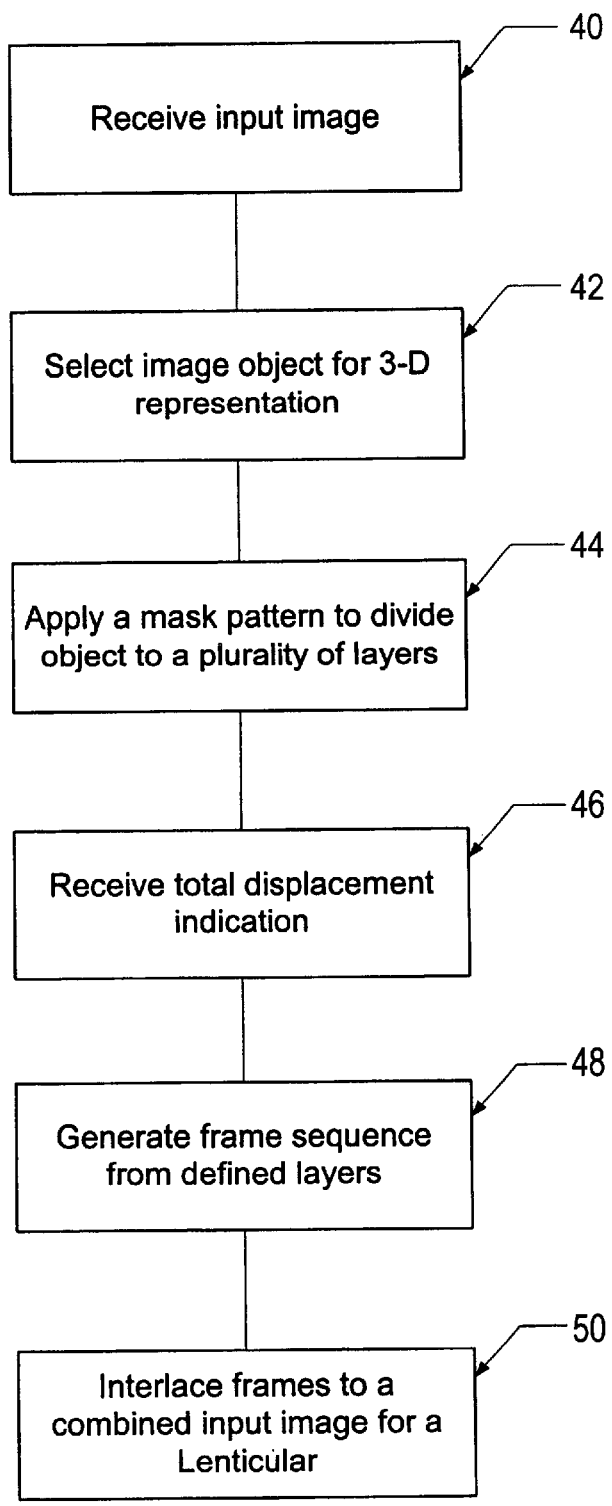
FIG. 3 is a flow diagram illustrating a method for simulating a 3-D image of a 2-D source image in accordance with the invention.

FIG. 3 is an overview of method steps for generating simulated 3-D image views at an object from an input 2-D image. The system receives a two dimensional image, which includes at least one object (step 40). Examples of such input images include photographs, art illustrations, and computer generated 2-D images. The image scan quality is preferably at least 300 dpi, CMYK, 60 MB file size. The scan and color are corrected and retouched as needed based on the scan result. Furthermore, the border outline of any object which is to be rendered must be recreated as part of the background to allow for the object portions to be displaced in an animation without creating pixel gaps. At least one object of the image is selected for 3-D representation (step 42). The system applies a mask series to at lease one object of the image to provide a plurality of object layers. The system receives a total displacement indication for the layer animation (step 45). A frame sequence is generated by employing the defined layers (46).

Figure 4:
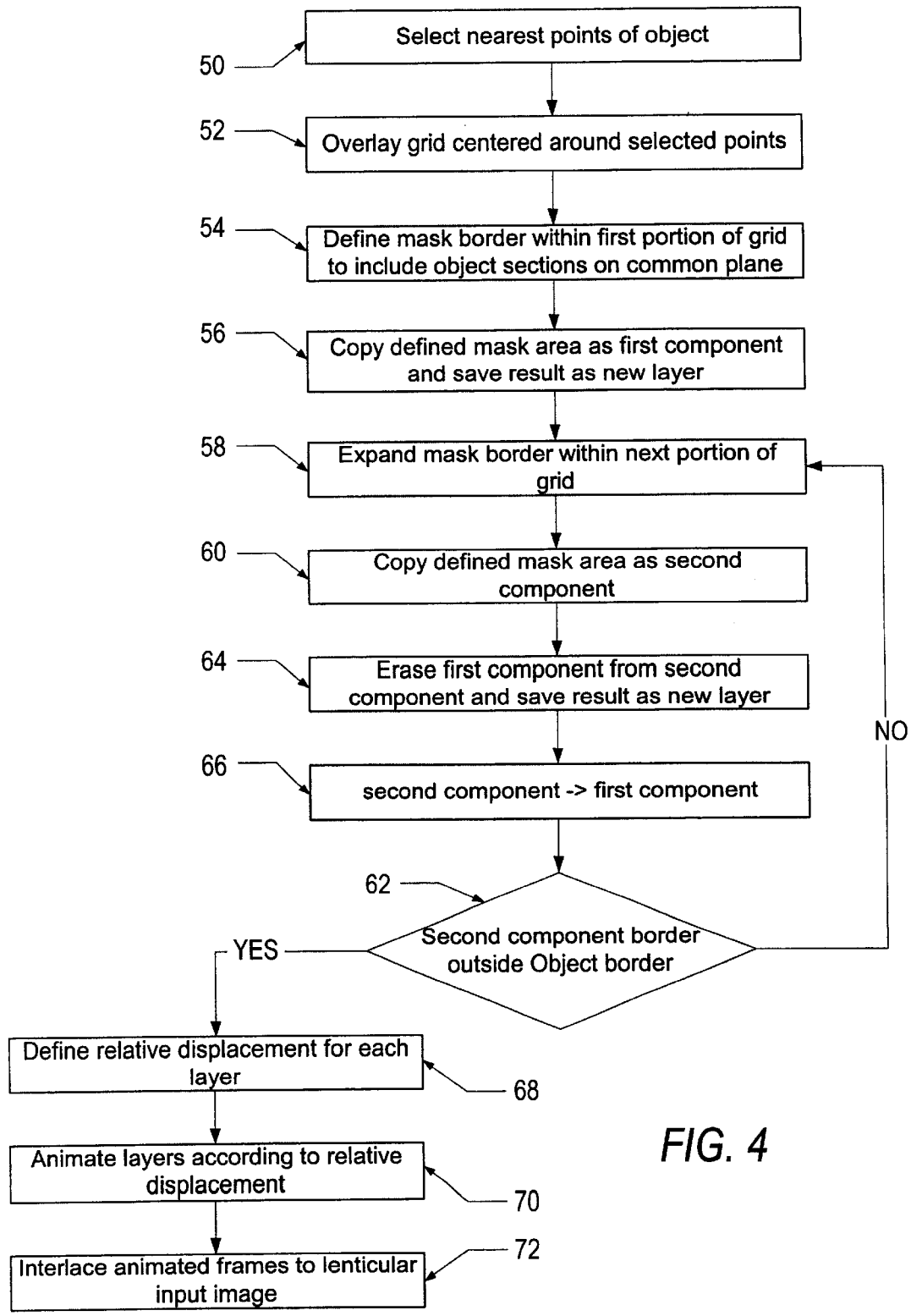
FIG. 4 illustrates a method for defining a mask series for an object of an input image.

The following discussion, with reference to FIGS. 4, 5, and 6, illustrates one method for constructing a mask series for defining layers for an object in accordance with the invention. As may be appreciated other methods may be employed to define the layers, which subdivide an object to a plurality of layers for 3-D simulation, without departing from the teachings of the invention. The mask series, defining the layers from the object, is preferably constructed by a designer as discussed herein, based on estimations and observation for the particular object type. The depths of various portions of the object are generally not known and therefore are estimated by the designer constructing the mask series. To estimate such relative depths, in one embodiment, a perspective is selected from which the object is presented to the viewer. The perspective includes an angle of view and depth of field. In one embodiment, one or more simulated profile views of the object are constructed to aid the designer in selecting the relative depths of various layers. In this embodiment, a plan is outlined to arrange the various co-planer layers, which make up the final 3-D simulated image. The different layers are grouped as part of the foreground, middle-ground, or background. The grouping is preferably used to later facilitate combining simulation frames of the objects, with proper relative depths, as one frame sequence, when the simulation frames for each object are independently generated.

Each object is preferably divided to a plurality of layers, which are defined by the mask series. The mask series is preferably generated by the designer outlining and cutting away select portions of the object to define a plurality of layers. Each layer is selected so as to include portions of the object that are relatively in the same cross-section plane of the object. As may be appreciated, the object portions in a layer may include non-continuous portions which share a common plane. As illustrated below with reference to FIG. 4, the layers are preferably defined starting from the portions of the object closest to the selected observation point and ending with the portions of the object farthest from the observation point. The number of defined layers for the object depends on the desired depth resolution and desired volumetric effect of the final simulation, the level of desired detail, and the total movement for all layers. As may be appreciated, the greater the number of layers, the better the depth resolution and corresponding volumetric effect. The mask series preferably defines layers which include portions of subsequent or previous layers. In one embodiment subsequent layers share common edges which are set to soft silluette to provide almost a transparent appearance. However, in a preferred embodiment, layers do not share more than a minimum number of pixels so as to avoid pixel overlap and other repetition during the animation when layers are displaced relative to one another.

FIG. 4 illustrates a method for defining a mask series for an object. As discussed above, the edges of the object and of each layer are preferably set to soft silhouette so as to easily integrate with the remainder of the image and with other layers. The nearest points to the observer containing portions of the object are located by approximating the relative depth of object portions (step 50). The nearest point to the observer is preferably associated with the least displacement of all points in the object to be animated. As may be appreciated, the location of the nearest point within the object's scenery space can be varied to relocate the object within the scenery while maintaining the volumetric appearance of the object, as provided by the animation. A layered grid is optionally superimposed on the object with its center within the identified nearest points to aid the designer in defining layers (step 52). A first mask boundary is defined to include object portions which contain the nearest points (step 54). The object portions within the mask boundary are copied as a first layer and are defined as a first component (step 56). Preferably, each layer is named with a corresponding relative displacement, which is used during the subsequent animation. The mask boundary is expanded to include additional portions of the object around each of the previous near portions (step 58). The boundary shape is preferably adjusted to generally include portions sharing another common plane, further away from the observer. The current object portions within the new mask edges are copied as a next component (step 60). The first component is erased from the second component and the result is saved as a new layer (step 64). The second component is renamed as the first component (step 66). The resultant layers are preferably stored as sequential layers. The designer determines whether the current component border is outside the object border (step 62). As may be appreciated, when the border is expanded, the designer ensures that the mask does not extend outside the object border unless all object portions have been copies to layers. If the component border is outside the object border, whereby it is the last component, the designer proceeds to define a relative displacement for each layer, as discussed above, by including the displacement value for each layer as part of the layer's stored data (step 68). Accordingly, the layer definitions provide a series of mask patterns. The defined mask patterns are stored for subsequent application to objects from other images. After relative displacement is assigned to each layer, the layers are animated by an animation program to provide for a frame sequence, as is known in the art (step 70). In one embodiment, the displacement for each layer includes both a relative movement value and a direction (+/31 ). One example animation program is Adobe AfterEffect from Adobe Systems. The animated frame sequence is interlaced for application to a lenticular surface (step 72). Alternatively the animated frame sequence is provided to a motion video player as a movie sequence.

Figure 5A:
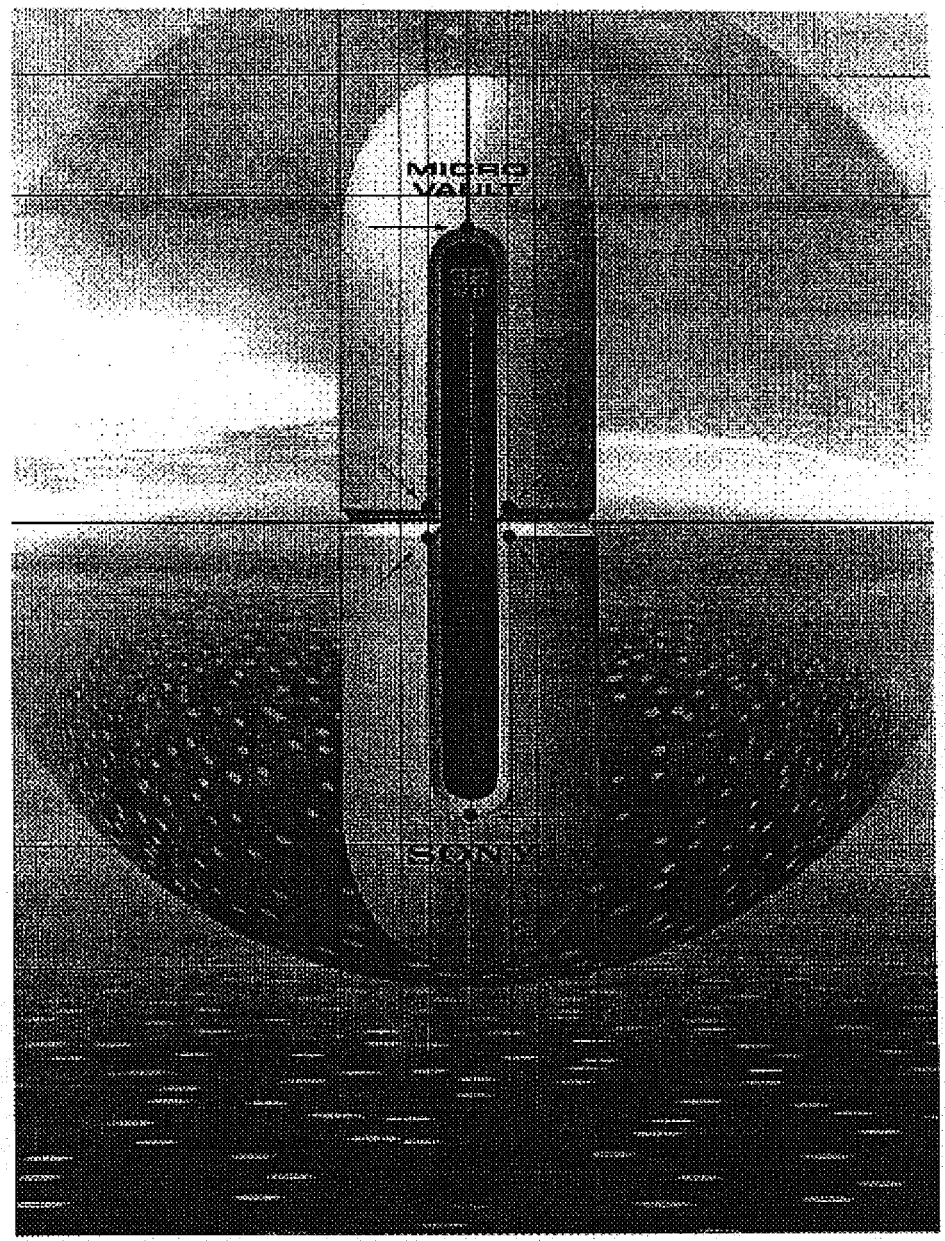
FIG. 5A illustrates an input image with an overlaid grid.
Figure 5B:
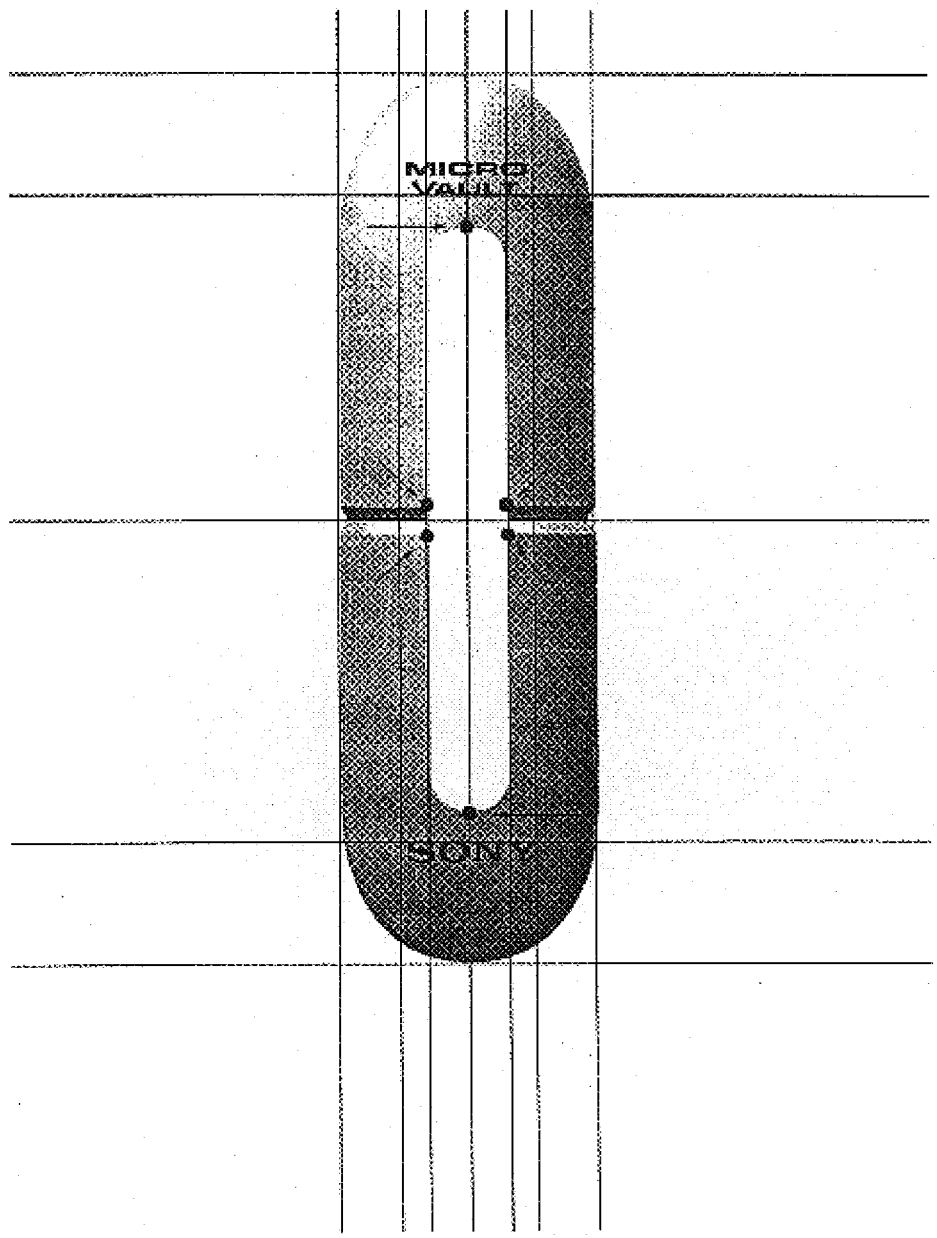
FIG. 5B illustrates an object of the input image.
Figure 5C:
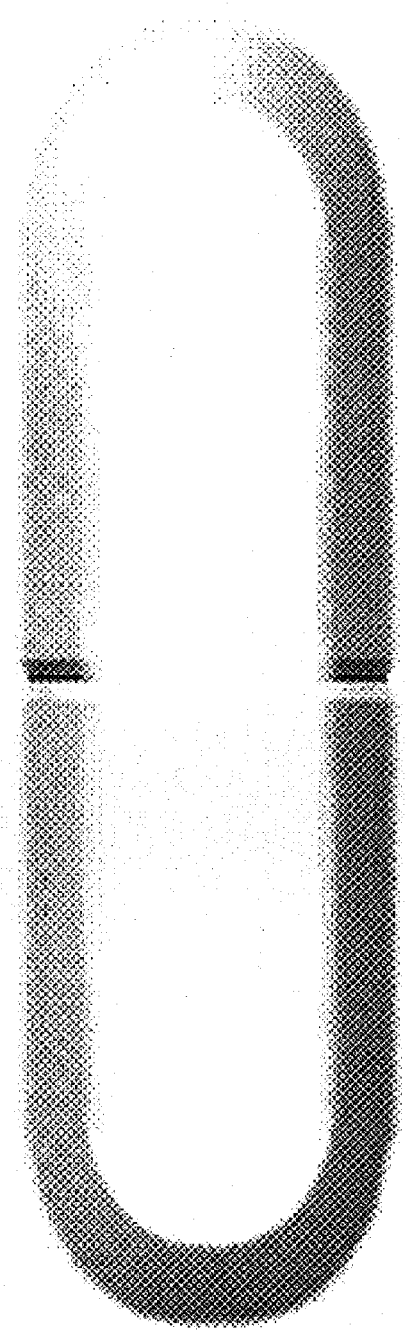
FIG. 5C illustrates a first layer of the object.
Figure 5D:
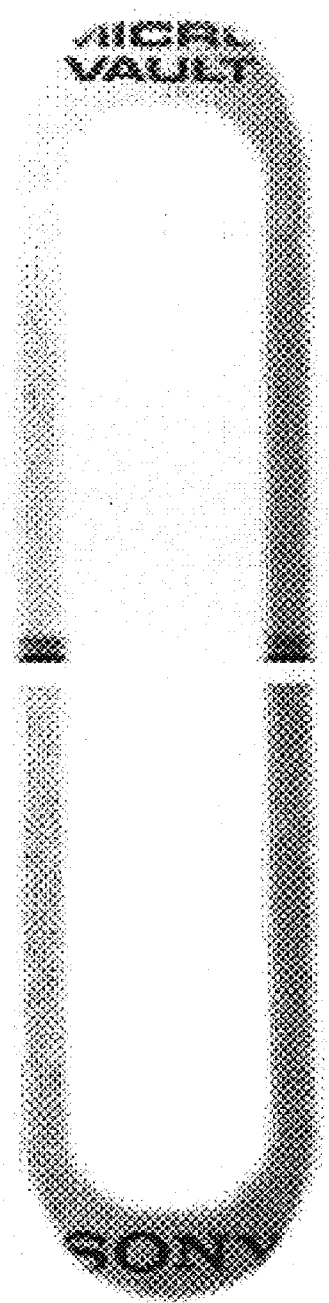
FIG. 5D illustrates a second layer of the object.
Figure 5E:
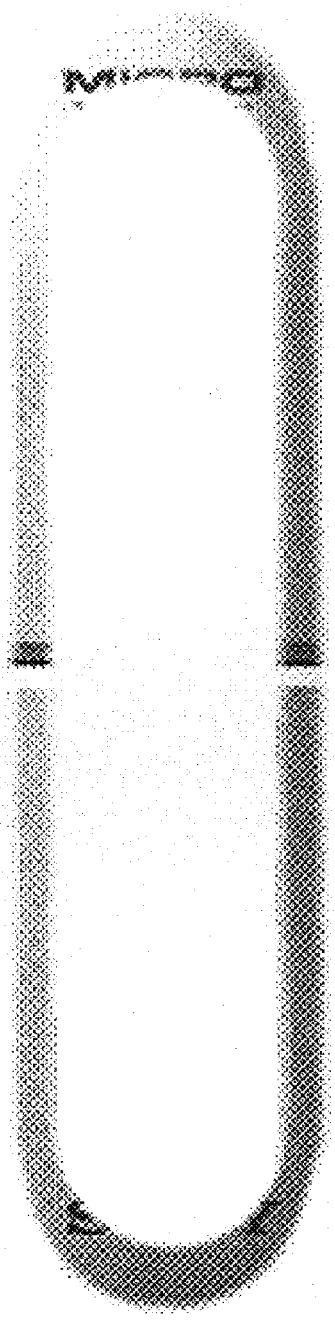
FIG. 5E illustrates a third layer of the object.
Figure 5F:
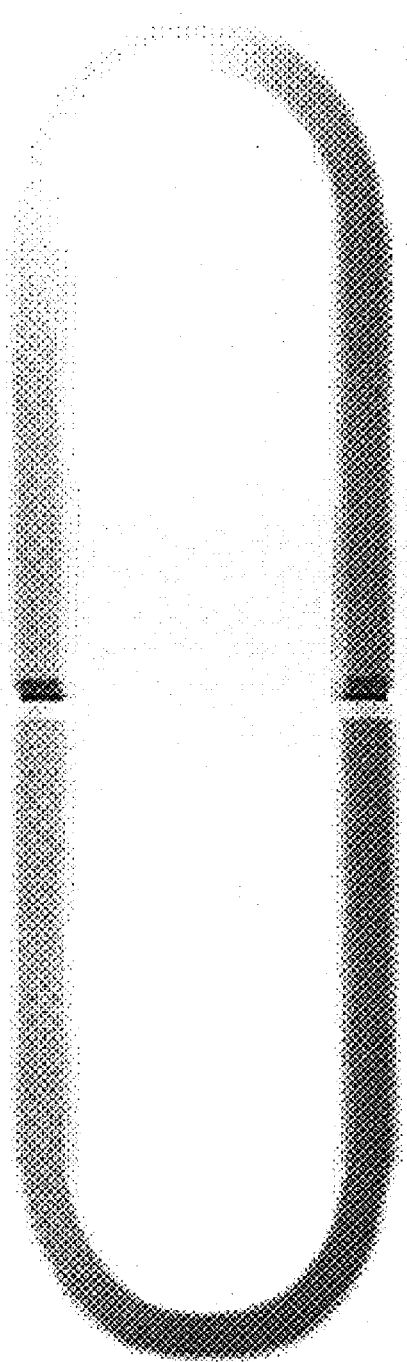
FIG. 5F illustrates a fourth layer of the object.
Figure 6A:
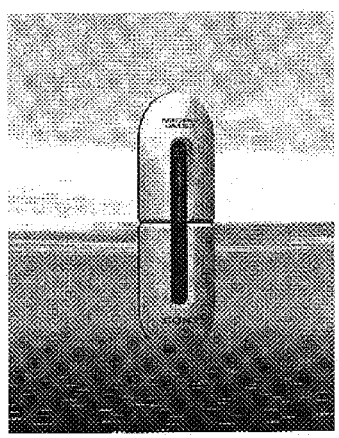
FIG. 6 illustrates a frame sequence for the object.
Figure 6B:
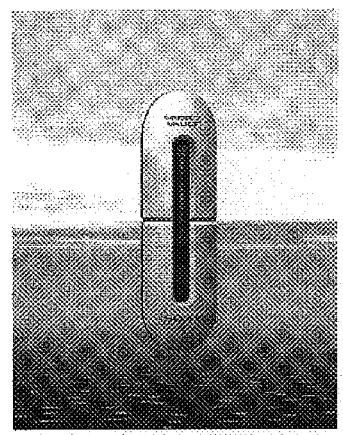
Figure 6C:
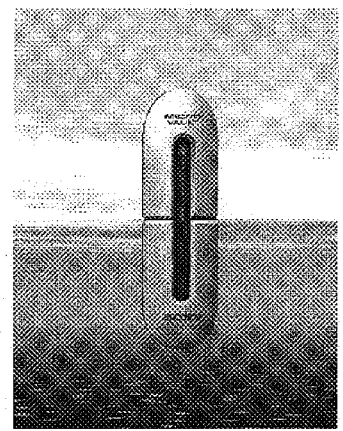
Figure 6D:
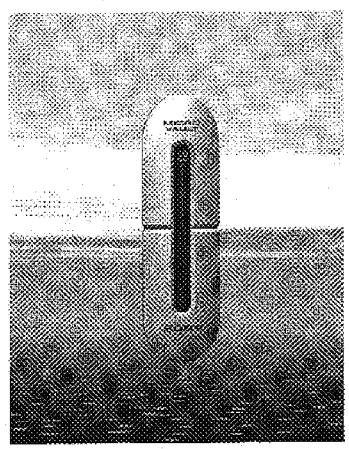
Figure 6E:
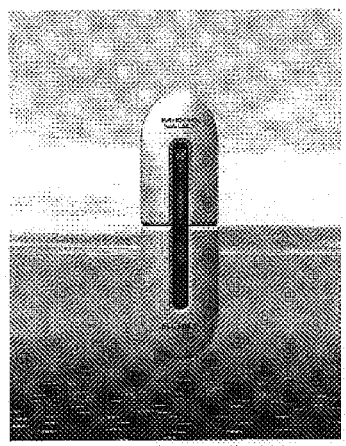
Figure 6F:
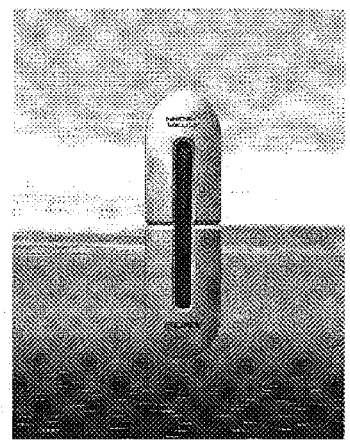
Figures 6G, 6H, 6I:
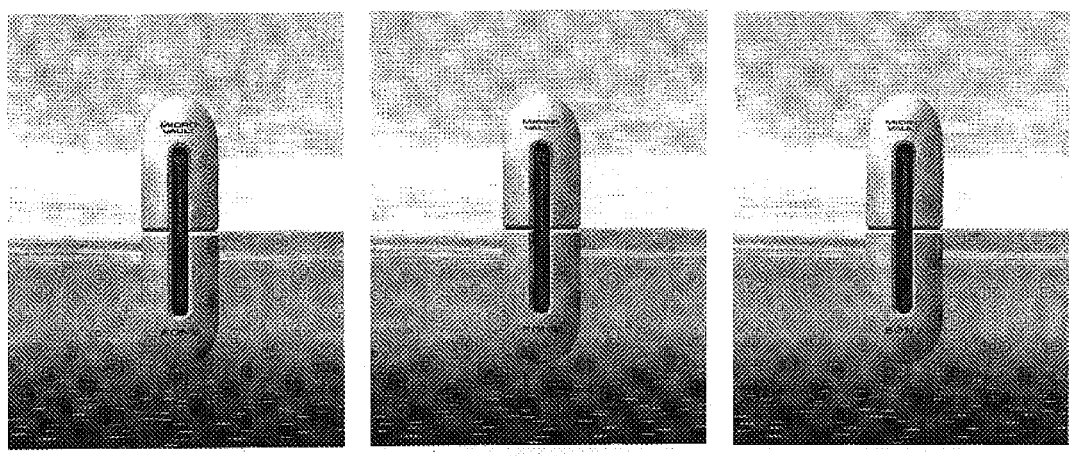

FIGS. 5A–5F illustrate an input image and a series of layer dissections for an object of the image. FIG. 5A illustrates an input image with a grid overlay as discussed with reference to step 52 of FIG. 4. FIG. 5B illustrates part of an object of the image, from which several layers are defined. The defined layers are illustrated in FIGS. 5C–5F. As discussed above, each layer includes portions of the object that are on the same cross-section plane from the observation point. Accordingly, each plane is a virtual slice of the object, wherein the slice is perpendicular to the observation axis. The arrows in the illustration of FIG. 5B indicate the nearest points for the object. The first layer defined from the object is around the defined near points. FIG. 5C illustrates the first layer of the object. The mask border is expended beyond the first layer border, to include additional portions of the object. The portions of the first layer are removed from the newly defined area to provide the second layer. FIG. 5D illustrates the second layer of the object. The mask border is further expanded beyond the second layer border, to include additional portions of the object. The second defined component is erased from the current component to provide the next component, the third layer. FIG. 5E illustrates the third layer. The mask border is further expanded beyond the third layer border, to include additional portions of the object. The third defined component is erased from the current component to provide the next component, the fourth layer. FIG. 5F illustrates the fourth layer. As may be appreciated, the process continues to provide for a plurality of layers from the object.

Each frame of the animation sequence, employed to provide the interlaced lenticular image, includes a snapshot of object layers at various horizontal displacements, based on the particular observation point and corresponding focus point. The animation of object layers of step 70 in FIG. 4 is preferably by a sub-process separate from the layer definition process. To generate the frame sequence corresponding to each object, the layers defined in the earlier stage are shifted relative to one another in accordance with the frame order in the sequence and the selected focus point. The layer displacement in each frame is preferably along a horizontal axis. Depending on the location of the layer relative to the focus point, the displacement is either in the left direction or in the right direction. For example, when a first layer is on one side of the focus point and a second layer is on the opposite side of the focus point, the first layer will be displaced in one direction and the second layer will be displaced in an opposite direction so as to simulate rotation about the focus point.

The relative displacement value for each layer is preferably determined by reference to the desired total displacement for the object. Specifically, the relative displacement for each layer depends on its relative distance from the focus point and the maximum displacement for the layer farthest from the focus point. As may be appreciated, layers that are closer to the focus point will have a smaller relative displacement value than layers further away from the focus point. In each frame of the sequence, each layer's relative displacement is preferably a multiple of the frame number in the frame sequence. For example, in one embodiment, a layer that has a displacement of 2 pixels relative to the focus point is displaced 2 pixels in frame 1, 4 pixels in frame 2, 6 pixels in frame 3 and so forth. This displacement relative to the focus point can be referred to as a "relative displacement," since it provides a basis displacement value which is multiplied by a frame number to arrive at a total displacement for a particular layer. As may be appreciated, the object volume is defined by the relative displacement value for each layer since the layer displacement magnitude provides the illusion of volume. Accordingly, the apparent distance between layers can be increased or decreased by changing the relative displacement values to thereby stretch or shrink the object. This allows the designer great freedom in defining objects with various volumetric characteristics.

In one embodiment, the total pixel displacement for all objects is limited to 450 pixels for positive movement (left to right) and 140 pixels for negative movement (right to left). The animation displacement preferably starts from a first frame that provides the object layers at a first extreme displacement value and ends on a final frame that provides the object layers at another extreme displacement value. The first frame position preferably includes layers displaced to an extreme left position with a maximum possible displacement of 31 450 pixels for positive relative displacement or +140 pixels for negative displacement. Each layer's relative displacement is inverted and multiplied by half of the total number of frames in the animation to arrive at the starting frame. The animation then proceeds to a final frame having a maximum possible displacement of +450 pixels for positive relative displacement and −140 pixels for negative relative displacement. Thus, by starting the animation from an already offset maximum position as opposed to the neutral position, the animation range is doubled to include twice the number of pixels for movement in both the positive and negative directions. Hence the animation will start from the offset maximum position and end at an offset calculated by multiplying each layer relative displacement by the total number of frames in the animation. Moreover, the animation sequence is fluid with smooth transition from a first angle to a final angle of view.

The relative displacement of the furthest layer from the focus point can be expressed as (Total displacement) divided by (Number of frames). Thus, for a symmetrical 32 frame sequence, simulating 3-D viewing, the maximum relative displacement is 280/32 or −8.75 pixels and 900/32 or +28.125 pixels. Hence the layer furthest from the focus point is limited to a relative displacement value of either −8.75 or +28.125, depending on the direction of movement. Thus, for layers selected uniformly distanced from the focus point, each layer's relative displacement can be expressed as (Maximum relative displacement) divided by (Number of layers from focus point) multiplied by (Particular layer number from focus point). Thus, for the above illustrated simulation having 21 layers, the focus point assumed to be in the center layer 11, the relative displacement is −0.875 ((280/32/10)*1) and +2.8125 ((900/32/10)*1) for layers 10 and 12, −1.75 ((140/16/10)*2) and +5.625 ((450/16/10)*2) for layers 9 and 13, and so forth. As may be appreciated, fractional displacement values can be associated with layers since the actual displacement results from multiplying by a factor, which provides a result that is later rounded to the nearest whole pixel.

The displacement of layers in each frame is preferably the relative displacement for each layer multiplied by the frame number from the focus point. Preferably, the resultant pixel displacement for each layer is rounded to the nearest whole pixel with half values rounded down. The process iterates over the entire frame sequence to provide an animation including layers of the object at various horizontal offset positions. In some embodiments, optional simulation effects are selected, such as color shift, rotation, opacity, and other filters usable in graphic software to manipulate appearance. Other optional effects include vertical displacement and vertical stretching. The animation frames are then rendered in accordance with the selected parameters.

FIG. 6 illustrates a sequence of animation frames for the object illustrated in FIG. 5A. The illustrated sequence includes 9 frames moving an observation point from left to right. As may be appreciated, in frame 1 more of the right portion of the object is visible to the observer since the observation point is to the left of the object. Frame 1 includes the object layers at a first extreme orientation. Conversely, in frame 9, more of the left portion of the object is visible to the observer since the observation point has been moved to the right of the object. Frame 9 includes the object layers and a second extreme orientation. Preferably, the greater the number of layers, which are defined for an object, the better the animation in simulating volume. The individual frames in the sequence of FIG. 6 are preferably combined into an interlaced image as discussed above with reference to general lenticular imaging techniques or are provided to a video motion player software.

Although the present invention was discussed in terms of certain preferred embodiments, the invention is not limited to such embodiments. A person of ordinary skill in the art will appreciate that numerous variations and combinations of the features set forth above can be utilized without departing from the present invention as set forth in the claims. Thus, the scope of the invention should not be limited by the preceding description but should be ascertained by reference to claims that follow.

What is claimed is:

1. A method for producing an input image for application from a two dimensional image onto an image surface adapted to present interlaced frames of the input image, comprising:

receiving an input image, the image including at least one object;

receiving layer definitions for a plurality of layers from at least one object of the input image, the layer definitions include data for object layers that are copied from the object by defining an area containing coplanar portions and removing a previously defined portion from the currently defined layer;

receiving an indication of the total displacement for the object animation;

determining a relative displacement for each layer from the plurality of layers;

generating a sequence of image frames by progressively offsetting said plurality of layers in accordance with relative layer displacement and a total animation displacement; and interlacing the animated sequence of frames to a combined image to provide an input interlaced image for application to said image surface.

2. A method for producing an input image for application from a two dimensional image onto an image surface adapted to present interlaced frames of the input image, comprising:

receiving an input image, the image including at least one object;

receiving layer definitions for a plurality of layers from at least one object of the input image;

receiving an indication of the total displacement for the object animation;

determining a relative displacement for each layer from the plurality of layers;

generating a sequence of image frames by:

selecting a focus point, the focus point associated with a layer from the plurality of layers which remains static when an observation point for the animation is varied;

assigning a relative displacement for each layer in the plurality of layers by reference to the received total displacement for the object, the number of frames in the frame sequence, and the number of layers between the layer and the focus point;

setting the layer displacement to a first extreme orientation by displacing each layer in the reverse to the relative displacement direction and by multiplying the reverse relative displacement by half of the total frame number; and displacing each layer in accordance with the assigned relative displacement and frame number in the sequence, the displacement of each layer in each frame provided by multiplying the frame number by the relative displacement to arrive at the layer displacement at a second extreme orientation to provide a symmetrical sequence of animation frames for the object; and interlacing the animated sequence of frames to a combined image to provide an input interlaced image for application to said image surface.

3. The Method of claim 2, wherein the total number of frames is 20.

4. A system for providing 3-D image effects of an object from a received single view image of the object, comprising:

dividing means to generate a plurality of layers from the object image;

sequencing means to define relative displacement for each layer in a frame sequence;

animation means to provide a sequence of animation frames, the object layers are progressively displaced relative to one another for each frame in accordance with the frame's order and displacement data for the layers to provide 3-D image effects for the object; and interlacing means for combining the frame sequence as a single interlaced image for application to a lenticular surface.

5. The system of claim 4, wherein said interlacing means further alters the interlaced image after combining the frame sequence, by applying color filters to the image to create variations of the image.

* * * * *